United States Patent
Franck, III et al.

(10) Patent No.: US 11,833,798 B2
(45) Date of Patent: *Dec. 5, 2023

(54) PANEL WITH PAINT READY SURFACE

(71) Applicant: B/E Aerospace, Inc., Winston Salem, NC (US)

(72) Inventors: George T. Franck, III, Santa Ana, CA (US); Alvin S. Bartolome, Eastvale, CA (US); Patrick G. Jarvis-Shean, Fullerton, CA (US)

(73) Assignee: B/E Aerospace, Inc., Winston Salem, NC (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/372,947

(22) Filed: Jul. 12, 2021

(65) Prior Publication Data

US 2021/0394501 A1 Dec. 23, 2021

Related U.S. Application Data

(63) Continuation of application No. 15/249,380, filed on Aug. 27, 2016, now Pat. No. 11,247,448, which is a
(Continued)

(51) Int. Cl.
*B32B 37/18* (2006.01)
*B32B 37/06* (2006.01)
(Continued)

(52) U.S. Cl.
CPC ............ *B32B 37/182* (2013.01); *B29C 35/02* (2013.01); *B29C 37/0075* (2013.01);
(Continued)

(58) Field of Classification Search
CPC ......... B32B 5/26; B32B 37/46; B32B 37/182; B32B 37/26; B32B 2037/268;
(Continued)

(56) References Cited

U.S. PATENT DOCUMENTS

| RE27,973 E | 4/1974 | Pennington |
| 4,029,845 A | 6/1977 | Nomura |

(Continued)

FOREIGN PATENT DOCUMENTS

| EP | 1055513 A1 * 11/2000 | ............ B32B 27/00 |
| GB | 1083307 A 9/1967 | |

(Continued)

OTHER PUBLICATIONS

B/E-Teklam High Performance Composite Panels, B/E Aerospace brochure, 21 pages.
(Continued)

*Primary Examiner* — Camie S Thompson
(74) *Attorney, Agent, or Firm* — Locke Lord LLP; Joshua L. Jones; Gabriella D'Angelo

(57) ABSTRACT

In a preferred embodiment, a composite panel with a smooth outer surface, ready for painting with or without addition of primer, may be created by constructing a panel layup assembly upon a mold, the panel layup assembly including a composite panel having a core and a resin formulation, and a release film between the mold and the composite panel, where a smooth release surface of the release film is in contact with the composite panel upon construction; initiating curing of the composite panel at a first temperature within a lowermost ten percent of a curing temperature range of the resin formulation; continuing curing of the composite panel at a second temperature above the lowermost ten percent of the curing temperature range; and completing curing of the composite panel at a third temperature below the second temperature.

5 Claims, 4 Drawing Sheets

Related U.S. Application Data continuation-in-part of application No. 14/631,790, filed on Feb. 25, 2015, now Pat. No. 9,987,832.

(60) Provisional application No. 61/945,330, filed on Feb. 27, 2014.

(51) Int. Cl.

| | |
|---|---|
| *B32B 37/14* | (2006.01) |
| *B32B 27/12* | (2006.01) |
| *B29C 70/30* | (2006.01) |
| *B29C 65/00* | (2006.01) |
| *B32B 3/26* | (2006.01) |
| *B29C 65/02* | (2006.01) |
| *B29C 37/00* | (2006.01) |
| *B29C 35/02* | (2006.01) |
| *B32B 27/38* | (2006.01) |
| *B29D 99/00* | (2010.01) |
| *B32B 5/26* | (2006.01) |
| *B29K 101/10* | (2006.01) |
| *B29K 105/08* | (2006.01) |
| *B29L 9/00* | (2006.01) |
| *B29K 101/12* | (2006.01) |
| *B29K 105/00* | (2006.01) |
| *B29K 309/08* | (2006.01) |
| *B29K 307/04* | (2006.01) |
| *B32B 37/26* | (2006.01) |

(52) U.S. Cl.
CPC .......... *B29C 65/02* (2013.01); *B29C 66/7254* (2013.01); *B29C 66/72141* (2013.01); *B29C 66/7375* (2013.01); *B29C 66/7392* (2013.01); *B29C 66/7394* (2013.01); *B29C 66/7422* (2013.01); *B29C 70/30* (2013.01); *B29D 99/0089* (2013.01); *B32B 5/26* (2013.01); *B32B 27/12* (2013.01); *B32B 27/38* (2013.01); *B32B 37/06* (2013.01); *B32B 37/146* (2013.01); *B32B 37/26* (2013.01); *B29C 37/0064* (2013.01); *B29C 2035/0283* (2013.01); *B29K 2101/10* (2013.01); *B29K 2101/12* (2013.01); *B29K 2105/0809* (2013.01); *B29K 2105/253* (2013.01); *B29K 2307/04* (2013.01); *B29K 2309/08* (2013.01); *B29L 2009/00* (2013.01); *B29L 2009/003* (2013.01); *B32B 2037/268* (2013.01); *B32B 2260/046* (2013.01); *B32B 2262/0269* (2013.01); *B32B 2262/101* (2013.01); *B32B 2305/10* (2013.01); *B32B 2305/72* (2013.01); *B32B 2309/025* (2013.01); *B32B 2315/08* (2013.01); *B32B 2323/10* (2013.01); *B32B 2331/00* (2013.01); *B32B 2363/00* (2013.01); *B32B 2367/00* (2013.01); *B32B 2377/00* (2013.01); *B32B 2379/00* (2013.01)

(58) Field of Classification Search
CPC ...... B32B 2260/046; B32B 2262/0269; B32B 2262/101; B32B 2305/10; B32B 2315/08; B32B 2323/10; B32B 2331/00; B32B 2367/00; B32B 2377/00; B32B 27/1238; B29C 37/0064; B29C 37/0075; B29C 66/7254; B29C 70/30; B29D 99/0089; B29K 2101/10; B29K 2101/12; B29K 2105/0809; B29K 2307/04; B29K 2309/08; B29L 2009/00
USPC .............................................. 428/304.4, 301.4
See application file for complete search history.

(56) References Cited

U.S. PATENT DOCUMENTS

| | | | |
|---|---|---|---|
| 4,846,908 | A | 7/1989 | Aldrich et al. |
| 4,925,728 | A | 5/1990 | Crass et al. |
| 5,492,722 | A | 2/1996 | Tait et al. |
| 5,830,548 | A | 11/1998 | Andersen et al. |
| 6,270,603 | B1 | 8/2001 | Westerman et al. |
| 7,186,310 | B2 | 3/2007 | Yamaguchi et al. |
| 8,435,370 | B2 | 5/2013 | Kruger et al. |
| 8,647,548 | B1 | 2/2014 | Humfeld |
| 11,247,448 | B2 * | 2/2022 | Franck, III .............. B29C 65/02 |
| 2002/0146954 | A1 | 10/2002 | Drees et al. |
| 2005/0069712 | A1 | 3/2005 | Strait |
| 2010/0143145 | A1 | 6/2010 | Jones |
| 2012/0177877 | A1 | 7/2012 | Lebail et al. |

FOREIGN PATENT DOCUMENTS

| | | |
|---|---|---|
| JP | S55-67413 A | 5/1980 |
| JP | S58-11142 A | 1/1983 |
| JP | 288227 | 3/1990 |

OTHER PUBLICATIONS

International Search Report issued in PCT/US2015/017856, dated May 13, 2015.

* cited by examiner

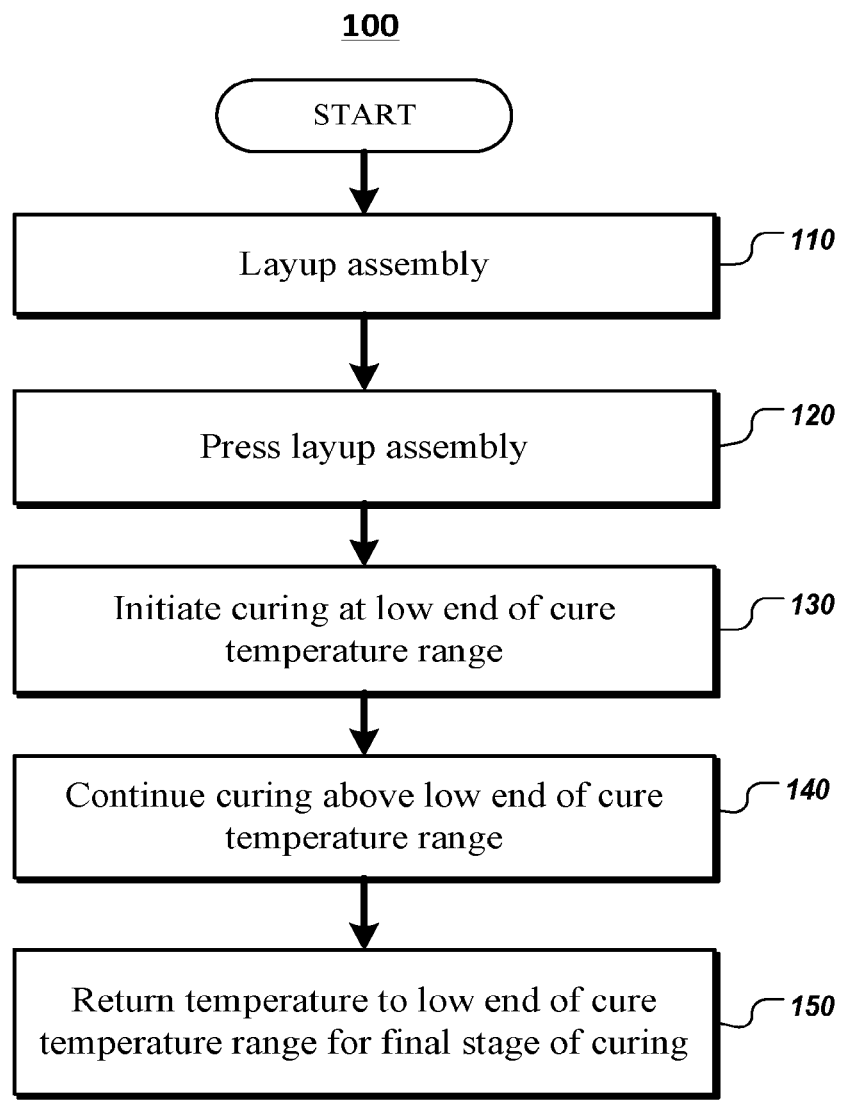

200a

200b

300

PANEL WITH PAINT READY SURFACE

CROSS REFERENCES TO RELATED APPLICATIONS

This application is a continuation of U.S. patent application Ser. No. 15/249,380 filed Aug. 27, 2016, which is a continuation-in-part of U.S. application Ser. No. 14/631,790, filed Feb. 25, 2015, which claims priority from U.S. Provisional Application No. 61/945,330, filed Feb. 27, 2014, the contents of which are incorporated by reference in their entirety.

BACKGROUND

Especially for structural materials and interior materials of aircraft, reinforced fiber composite materials are increasingly used as skins in honeycomb sandwich panels for reduction of weight. Composite sandwich panels formed of reinforcing fibers and a resin are widely used for aircraft, automobiles and other industrial applications because of their strength and weight characteristics. The details of the process by which these panels can be formed is described generally in U.S. Pat. No. 7,186,310 entitled "Method for Forming a Honeycomb Composite Sandwich Panel", the contents of which are fully incorporated herein by reference.

One goal in the construction of composite panels is to limit and decrease an amount of surface defects, such as pitting, telegraphing, pocks, voids, and creases, which lead to both mechanical defects as well as costly post-production operations. During manufacturing of the panels, thermal shock in the curing step can cause pitting and dimpling of the skin surface to the panel. This thermal shock can cause volatile organic compounds (VOC) to release resulting in small pits on the surface of the panel. The rapid release of the VOCs result in bubbles, which in turn lead to small pits and cavities in the surface of the panel which must be repaired prior to painting.

Honeycomb sandwich panels are typically manufactured by laminating a honeycomb core made of aramid paper with prepreg laminates on both sides and curing the prepreg laminates while bonding the prepreg laminates to the honeycomb core as so-called co-curing. A pre-impregnated composite fabric or prepreg is a fabric reinforcement that is pre-impregnated with a resin system. In this case, the adhesive strength between the honeycomb core and the prepreg laminates as skin panels is important. A method of including adhesive films between the honeycomb core and the prepreg laminates and curing the prepreg laminates together with the adhesive films for fabricating a sandwich panel has been used.

Furthermore, to decrease surface defects such as pits and resin blurs on the panel's skins, one approach has been to stick adhesive films on the surfaces of prepreg laminates, to allow them to cure together with the prepreg laminates. However, this approach increases weight, material cost and labor cost.

In typical manufacturing operations for aerospace applications, after assembly the panels are subjected to a "fill and fare" to address surface defects. That is, the manufacturing process produces a panel surface that contains inherent and unacceptable defects such as pitting and telegraphing. Pitting leaves very small pinholes in the surface of a panel that must be filled prior to any painting. Telegraphing is a result of the facing material drooping into the empty area of the honeycomb core. This produces a surface that is not perfectly flat and can be observed after the painting process unless further remediation is performed on the finished panel.

The first step of the "fill and fare" operation is a fill and sand step, where putty material is spread onto the surface to fill in the gaps, pits, and holes. There is significant labor in this step, which adds costs to the panel, and adds a slight weight increase as well due to the added weight of the putty material. Alternatively, surface films can be added to provide smooth surface to the panel. However, there are increased material costs associated with surfacing films that add weight to the panel as well as labor costs needed to apply the film. In some cases, peel ply materials are used, which also add weight and time to the manufacturing process.

All three of these remedial steps use expendable release materials to process the panels. Moreover, these "fill and fare" operations are both time consuming and costly, and add significantly to the manufacturing costs of the panels. It would be desirable to eliminate or significantly reduce the amount of "fill and fare" procedures prior to painting.

SUMMARY OF ILLUSTRATIVE EMBODIMENTS

By altering the release materials and processing parameters, certain embodiments eliminate or reduce the amount of extra labor and material costs associated with a fill and fare or other remedial procedure. Certain embodiments achieve this objective without adding additional weight to the panel.

In one embodiment, a method comprises processing a phenolic and epoxy resin pre-impregnated composite fabric to bond to a honeycomb core, thereby forming a composite sandwich panel having a smooth, paint-ready surface post-production. The resin system includes a respective curing agent. The fabric reinforcement is ready to lay into a mold without the addition of additional resin and without the steps required of a typical hand lay-up. After the prepreg is cured and bonded to the honeycomb core, the prepreg is considered a skin.

In another embodiment, a method is provided for curing a composite panel, including: inserting a biaxially oriented polypropylene release film and the composite panel into a mold, initiating curing of the composite panel at a temperature within a lowermost ten percent of panel curing temperature range, continuing curing of the composite panel at a temperature above the lowermost ten percent of panel curing temperature range, and completing curing of the composite panel at a temperature within the lowermost ten percent of a panel curing temperature range. This procedure has been found to substantially reduce voids and other defects and enables the production of a honeycomb panel that is paint ready and does not require an intermediate fill and fare step to remediate imperfections in the surface. Alternatively, the process may produce a panel which requires substantially reduced defect remediation.

BRIEF DESCRIPTION OF THE DRAWINGS

A more complete appreciation of the innovations and many of the attendant advantages thereof will be readily obtained as the same becomes better understood by reference to the following detailed description when considered in connection with the accompanying drawings, where:

FIG. 1A is a flow chart of steps of a curing process used to prepare a composite panel according to an example;

DETAILED DESCRIPTION OF ILLUSTRATIVE EMBODIMENTS

Figure 1B:
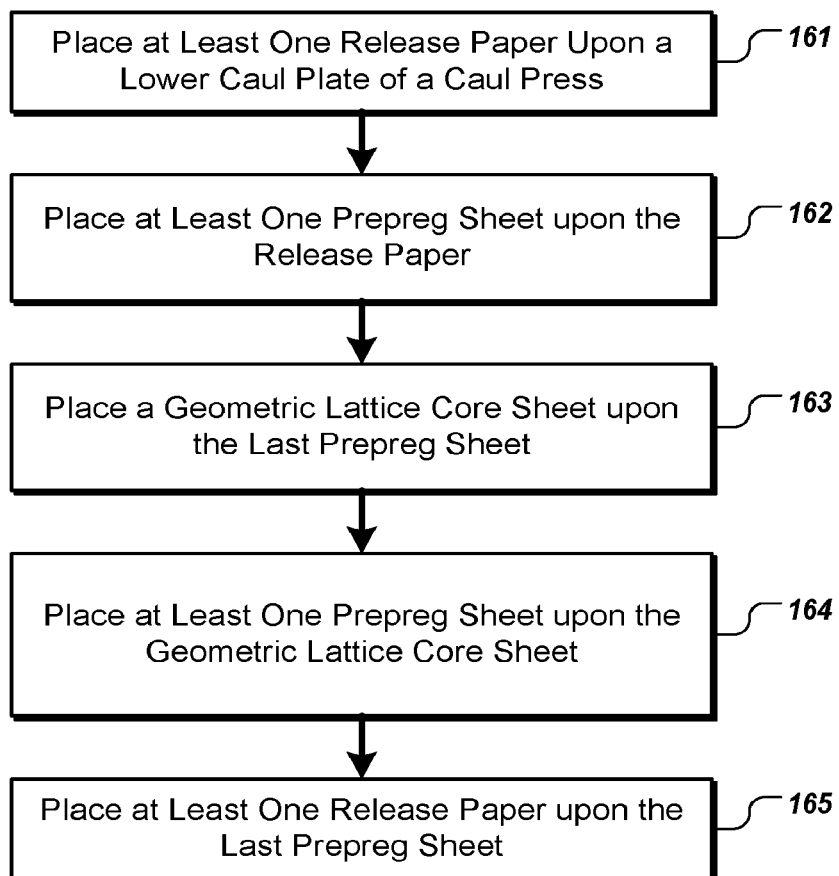
FIG. 1B is a flow chart illustrating a method for assembling a layup of a set of layers of the composite panel according to an example.

A curing process is provided for manufacturing a composite panel configured to have a smooth, pit-free surface that is ready for painting with minimal fill and fair processing. The composite panel can be a phenolic or epoxy resin prepreg honeycomb sandwich panel using a fabric reinforcement. A prepreg is a reinforced material pre-impregnated with a polymer or resin matrix in a controlled ratio.

Examples of honeycomb cores include aramid honeycomb cores, aluminum honeycomb cores, Nomex® honeycomb cores, and Kevlar® honeycomb cores. Aramid honeycomb cores are frequently used in external vehicular panels (e.g., boat hulls, train cars, auto racing bodies) as well as interior panels. Kevlar® aramid honeycomb cores are also available, designed to aerospace standards. Aluminum honeycomb cores have good moisture, corrosion, and fungi resistance as well as flame resistance. They are often used for floor panels and countertops.

Resins can be both thermoplastic and thermosetting. Types of resins include polymers, phenolic, bismaleimide, cyanate ester, polyester, and vinyl ester. In commercial airplane interior panel design, the resin used is typically an epoxy resin with a built-in curing agent. Epoxy resin, a type of polymer resin, provides the necessary adhesion properties as well as the viscosity to avoid much resin seepage into the honeycomb cells. It provides superior strength and dimensional stability to many other resins. Vinyl ester resin, a hybrid product, has excellent corrosion resistance and temperature resistance. However, it is not as strong as epoxy resin. Polyester resin is relatively inexpensive, easy to use and widely applicable. However, it lacks the strength of the epoxy resin and vinyl ester resin options. Phenolic resin provides heat resistance properties beneficial to flame retardance. Bismaleimide resin can be configured to cure during a two-phase temperature set without creating condensation by-products and can be used for co-curing over a honeycomb core. Cyanate ester resin has good moisture resistance, making it a good candidate for panels which are used in hot and damp environments. Its electrical properties make it beneficial in reflector, antenna, and signal control uses. The fabric reinforcement can be made from different types of fiber including glass, carbon, aramid, and aluminum. Other types of fiber can be used for special applications. The fibers making the fabric reinforcement can be unidirectional or woven into different weave types, such as a plain weave, a twill weave, and a satin weave. The fabric reinforcement, for example, may include a fiberglass or Kevlar® to be electrostatic charge resistant. Fiberglass is lightweight with moderate tensile strength. Kevlar® is strong and has good abrasion resistance. It is often used in panels where impact resistance is important. Carbon fiber is more expensive than fiberglass or Kevlar®, but it has the highest tensile strength. Carbon fiber, additionally, has the highest compressive, bend, and flexural strength of commonly used reinforcement layer materials. Carbon fiber will often be used in load bearing panels.

There are two main types of manufacturing methods for producing a prepreg; a hot melt method and a solvent dip method. The hot melt method is conducted in two stages. In a first stage, the resin is heated and coated onto a paper substrate in a thin film or resin film. In a second stage, the fabric reinforcement and the resin film are brought together. A roller may be used to apply a pressure to implant the fibers in the resin film, combining heat and pressure. In the solvent dip method, the resin is dissolved in a bath of solvent forming a resin solution. Next, the reinforcing fabric is dipped into the resin solution. Using an oven, the solvent is then evaporated from the prepreg.

In certain embodiments, the curing process is a low cost procedure that does not require any additional materials in the panel to carry out the manufacturing operation, such as a peel ply or surfacing film.

Referring to FIG. 1A, a method 100 is provided for curing a composite panel having a surface that is smooth, defect-free. At step 110, panel layup is performed to prepare the panel for curing. Layup of the panel should be performed in a designated controlled contamination area to ensure that dirt, dust, aerosols, and other particulate matter do not contaminate the panel materials. In one embodiment, the layup, pressing and/or curing steps are performed in an environment that complies with US FED STD 209E cleanroom standards, which are incorporated herein by reference. In another embodiment, the layup, pressing and/or curing steps are performed in an environment that complies with ISO 14644-1 cleanroom standards cleanroom standards, which are incorporated herein by reference. Us of ISO compliant clean rooms have the advantage that they, in some embodiments, have lower particle counts and and smaller particles. In a preferred embodiment, the clean room is has an ISO classification of 1-5. In yet another embodiment, the layup, pressing and/or curing steps are performed in an environment that complies with BS 5295 or GMP EU cleanroom standards cleanroom standards, which are incorporated herein by reference. BS 5295 cleanrooms have the advantage that they do not permit any particles greater than 5 µm.

In preferred embodiments, the count of particles per square meter exceeding 1 µm is 1000 or less, 100 or less, or most preferably 10 or less. In preferred embodiments, the count of particles per square meter exceeding 5 µm is 10 or less, most preferably 1 or less.

Use of the foregoing clean room environments has been considered undesirable in the industry because of a perception that they would increase the net cost and complexity of the manufacturing process. However, the inventors have found that the techniques described herein generate cost savings which substantially outweigh the incremental additional cost of performing the process in a clean room environment.

Figure 2A:
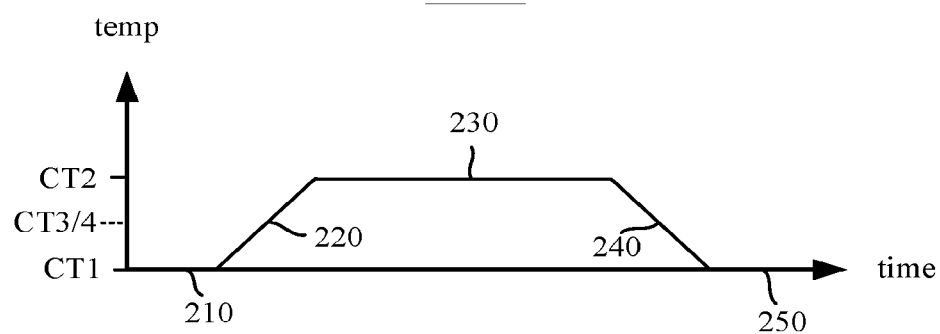
FIGS. 2A and 2B are illustrations of temperature curing profiles of the curing process used to prepare the composite panel according to an example.
Figure 2B:
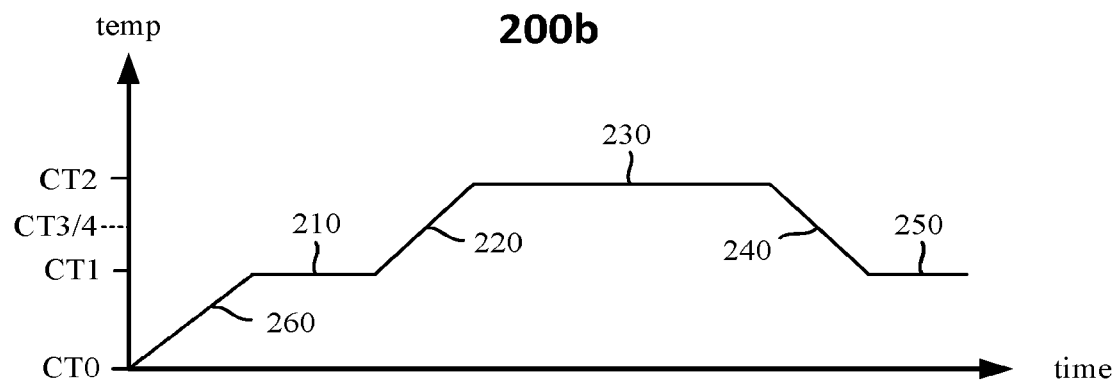

The curing of the composite panel (steps 130-140) can be done in an oven such as an autoclave. In an example, the autoclave can have memory and can be configured to be programmable with a curing temperature profile 200a-b such as shown in FIGS. 2A and 2B. These figures will be discussed in further detail below.

Figure 3:
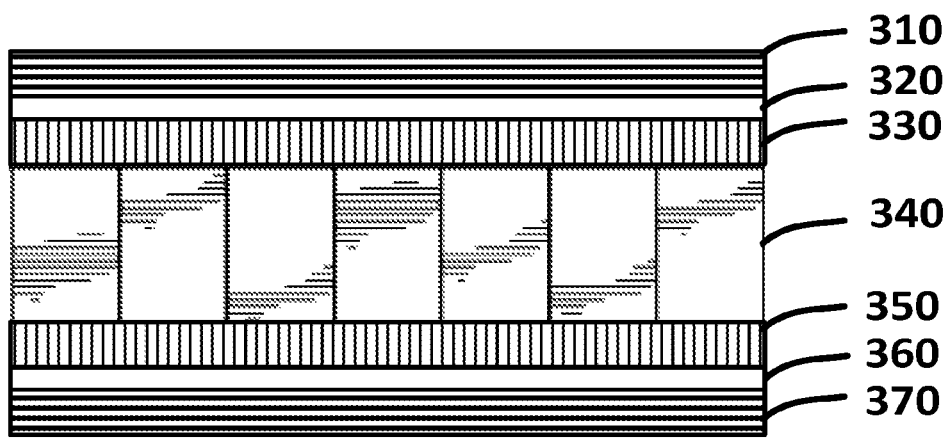
FIG. 3 is a block diagram of layers of a composite panel according to an example.

FIG. 1B is a flow chart that illustrates a method 160 for assembling a layup of the layers of the composite panel, (step 110). The method 160, for example, may be used to manufacture a composite panel as illustrated in FIG. 3.

In some implementations, the method 160 begins with placing at least one release paper upon a lower caul plate of a caul press (161). A first release paper, for example, may be positioned with its release side facing the caul plate. The release paper (film or other material) is designed to help separate the composite panel from the caul press after curing. A second release paper may be positioned with its release side facing away from the caul plate.

In some embodiments, a caul sheet is placed between the caul plate and the first release paper. A caul sheet is typically a smooth, flat metal sheet that is used as a surface for laying up panels. In preparation, resin buildup on the caul sheet from previous cures should be removed from the caul sheet. The caul sheet can be cleaned using a solvent. It is important for the caul sheet to be clean and to be free from scratches, waviness, dents and other imperfections. Imperfections in the caul sheet are likely to result in imperfections in the cured panel.

In some implementations, at least one prepreg sheet is placed upon the release paper (162). If two release papers are used, the first prepreg sheet is placed upon the release side of the second release paper.

In some embodiments, subsequent prepreg sheets or other material layers are laid either prior to the first prepreg sheet or upon the first prepreg sheet. For example, a copper foil layer may be applied between the second release paper and the first prepreg sheet. Where multiple prepreg sheets are used, the prepreg sheets may be designed such that a resin differential will exist between the caul plate-facing side of the first prepreg sheet and the caul plate-opposing side of the last prepreg sheet.

In some implementations, a geometric lattice core sheet is placed upon the last prepreg sheet (163). The geometric lattice core sheet, for example, is laid upon the heavier resin application side of the last prepreg sheet where the prepreg sheet is prepared in the manner described in U.S. application Ser. No. 14/631,770, filed Feb. 25, 2015, and entitled Composite Sandwich Panel with Differential Resin Layers, or U.S. application Ser. No. _____, filed Aug. 27, 2016 and entitled Composite Sandwich Panel with Differential Resin Layers, the entirety of which are herein incorporated by reference. The geometric lattice core sheet, in a particular example, is a hexagonal honeycomb core.

In some implementations, at least one-prepreg sheet is placed upon the geometric lattice core sheet with its heavier resin application side facing the geometric lattice core sheet (164). The prepreg sheet may be of the same or different material and/or construction than the prepreg sheet used to interface with the other side of the geometric lattice core. In some embodiments, subsequent prepreg sheets or other material layers are laid upon the first prepreg sheet. Where multiple prepreg sheets are used, the prepreg sheets may be designed such that a resin differential will exist between the core-facing side of the first prepreg sheet and the core-opposing side of the last prepreg sheet.

In some implementations, at least one release paper is positioned upon the last prepreg sheet (165). A first release paper, for example, may be positioned with its release side facing the last prepreg sheet. A second release paper may be positioned with its release side facing away from the last prepreg sheet (e.g., towards an upper caul plate). In some embodiments, a caul sheet is placed between the upper caul plate and the second release paper.

In an example, the composite panel can be prepared using a layup assembly 300 with the following configuration, whose layers are shown in FIG. 3: a mold 310, a release film 320, a prepreg 330, a honeycomb core 340, a prepreg 350, a release film 360, and a mold 370.

For a first layer in the panel layup, a mold 310 is prepared. The mold 310 can be a caul sheet or caul plate. A caul sheet is typically a smooth, flat metal sheet that is used as a surface for laying up panels. In preparation, resin buildup on the caul sheet from previous cures should be removed from the caul sheet. The caul sheet can be cleaned using a solvent and a cloth. It is important for the caul sheet to be clean and to be free from scratches, waviness, and dents. Imperfections in the caul sheet are likely to result in imperfections in the cured panel.

In an example, the surface of the caul sheet can first be made smooth by a multi-step sanding process. An initial sanding step can be performed for removing any scratches, resin buildup, and uneven surfaces in the caul sheet. This sanding step can be performed using a first grit sandpaper having a first grit grade, for example, 100 grit sandpaper. An additional sanding step can be performed using a second grit sandpaper having a second grit grade, for example, 320 grit sandpaper. The additional sanding step is configured to smooth out the caul sheet to a fine, even surface. Once the conditioning of the caul sheet is complete, the smoothed caul sheet surface can be wiped with a solvent prior to use to remove any particulates and dust from the caul sheet surface, as discussed above.

For a second layer in the panel layup, a release film 320 is placed onto the mold. The release film 320 or material is configured to help separate the prepreg 330 from the mold 310.

In an example, the release film 320 can be made from a polypropylene film. Polypropylene is a thermoplastic polymer with resistance to corrosion and chemical leaching and physical strength and rigidity that can withstand the heat of an autoclave.

In an example, the release film 320 can be made from a bi-axially oriented polypropylene film (BoPP). BoPP is a material with good clarity, resistance to UV light, excellent chemical and abrasion resistance, a water vapor barrier, stiffness, dimensional stability, and most notably an ultra-smooth surface. BoPP also has reasonable scuff resistance and yet is softer and more flexible than polyester or other similar films. Further, BoPP film can be flame or corona treated in-line, for ease of printing, metallizing, or laminating to other substrates. When used as release film 320 in the manufacture of a prepreg panel, the BoPP does not compress like typical release papers, and therefore minimizes core telegraphing in the finished panel. An example of a biaxially oriented film is available from ViAm Films of Morristown, Tennessee.

During layup, the release film 320 should be positioned such that no creases or folds are present, because creases and folds will transfer to the cured panel. Similar to the mold 310, release film 320 should be free of dust and particles, which are also likely to result in imperfections in the cured panel. In an example, the release film 320 is configured to release only on one side of the release film and, therefore, is placed with the releasing side facing the prepreg.

For a third layer in the panel layup, a prepreg 330 is positioned. If the prepreg 330 is a prepreg with differential resin content, the higher resin side of the prepreg 330 is to be placed against the core 340. In an example, prepreg 330 represents a number of prepregs. The prepregs can be positioned in an alternating 90°-0° perpendicular orientations. Alternatively, the prepregs can be positioned at angles 30, 45 or 60 degrees relative to the adjacent layer. Prepreg 330 should be kept free from contamination during handling, which is facilitated by use of the clean rooms described above.

For a fourth layer in the panel layup, a honeycomb core 340 is prepared and positioned. The surface of core 340 should be substantially flat with no waviness, and prior to layup, the core 340 should be dried to remove all moisture that may lead to corrosion or degradation. Drying may be performed in an oven of approximately 250±50° F., for approximately one hour, up to twelve hours. Layup of the core 340 should be timely performed after drying. The core 340 can be positioned on the prepreg 330 such that the ribbon direction of the core 340 is parallel to the direction of the fibers of the innermost prepreg 330.

The remaining layup layers, prepreg 350, release film 360, and mold 370, are mirrored and substantially similar to prepreg 330, release film 320, and mold 310, described above.

At step 120, the layup assembly 300 is placed in a press, such as a multi opening press. Between the platens of the multi opening press and the layup assembly 300, an intermediate padding material such as chipboard or the like may be used to assist in distributing pressure evenly. The press is closed with a pressure of approximately 20-80 psi, more preferably 30-70 psi and most preferably 50-60 psi. If multiple layup assemblies are to be cured, it is recommended that the layup assemblies be positioned in a single layer (i.e., not stacked).

To cure the panel materials in the layup assembly 300, an in-cold/out-cold process is to be used, an example of which is shown as the curing temperature profiles 200*a* and 200*b* in FIGS. 2A and 2B. In the in-cold/out-cold process, temperatures are maintained at the low end of the material's cure temperature range, preventing thermal shock to the panel and avoiding surface defects. Temperatures during the curing process may be observed, for example, via a thermocouple (not shown) attached to the panel.

At step 130, curing is initiated at a low end of a cure temperature range CT1 of the panel materials (see 210 in FIGS. 2A and 2B). In an example, temperature CT1 is within the lowermost ten percent of the panel curing temperature range. Temperature CT1 may be, for example, approximately 115-175° F., preferably 125-165° F., more preferably 135-155° F., and most preferably 140-150° F. for a fiberglass phenolic Nomex® core sandwich panel. In various embodiments, CT1 is within the lowest 30% of the panel curing temperature range, more preferably in the lowest 20% of the panel curing temperature range, even more preferably in the lowest 15% of the panel curing temperature range and most preferably in the lowest 10% of the panel curing temperature range.

In an example, at step 130, optionally, the temperature is ramped up to the low end of a cure temperature range CT1 of the panel materials from a lower temperature CT0 (see 260 in FIG. 2B). Given that the panel materials may be stored under different conditions and have different thermal properties, this initial ramp up can minimize an initial thermal shock from any initial temperature differences in the panel materials.

Curing proceeds by ramping up the temperature to a cure temperature CT2 (see 220 in FIGS. 2A and 2B). In an example, ramping up of the temperature can be configured to allow volatiles to escape and to not cause thermal shock, thus leading to a smoother resulting surface. For example, the temperature ramp rate should not exceed a rate of approximately 10° F./min. In an example, the duration of the ramp up can be based on a gel time of the resin. Examples of the gel time can vary from 30 min to 2 hours.

At step 140, the panel continues curing at temperature CT2 (see 230 in FIGS. 2A and 2B). In an example, temperature CT2 may be between 260° and 350° F. At a temperature of approximately 260° F., curing may continue for approximately 60-90 minutes, for example. CT2 and the cure times at that temperature may be 200-400° F. and 30-120 minutes, more preferably 250-300° F. and 40-100 minutes, or most preferably 250-270° F. at 60-90 minutes for a fiberglass phenolic Nomex® core sandwich panel. In various embodiments, CT2 is within the highest 30% of the panel curing temperature range, more preferably in the highest 20% of the panel curing temperature range, more preferably in the highest 15% of the panel curing temperature range, and most preferably in the highest 10% of the panel curing temperature range.

At step 150, curing is completed at temperature CT1 (see 250 in FIGS. 2A and 2B). In an example, ramping down of the temperature (see 240 in FIGS. 2A and 2B) can be based on the panel materials and configured not to cause thermal shock. For example, the temperature ramp down may be set so as not exceed a rate of approximately 10° F./min. In other embodiments, the temperature ramp is in the range of 1-50° F./min, more preferably 5-30° F./min, and even more preferably 5-20° F./min.

In other embodiments, the process of FIGS. 2A-2B may be modified from a cold-in/cold-out process. The process may be a cold-in/warm-out process that ramps down to temperature CT3 rather than CT1, wherein CT3 is between CT1 and CT2. This may be done in recognition of the fact that the curing process is mostly complete and the formation of bubbles and other defects are less likely at the tail end of the curing process for certain epoxy resin formulations. This alternative process is faster because the panels is maintained at a higher average temperature.

Alternatively, the process may be warm-in/cold-out to reduce processing times for resins which are more susceptible to defection formation toward the end of the curing process. In such a process the curing is started at CT4 rather than CT1, wherein CT4 is between CT1 and CT2. This alternative may be appropriate for resins which outgas substantially at near the end of the curing time and for resins for which cross linking occurs exponentially over time, causing the resin to remain relatively soft and prone to defect formation until the end of the cure time.

Still further, the process may be modified such at it is hot-in/cold-out or cold-in/hot-out. These are extensions of the previous two alternatives in that the panel is subjected to the high curing temperature (CT2) instead of the warm temperature (CT3 or CT4). This further expedites the curing process and may be the preferred process for resins having the characteristics described in the preceding two paragraphs.

The process may be further modified such that the panel is not maintained at lower ("cold" or "warm") temperature but rather thermal shock is avoided by ramping the temperature gradually up from CT1/CT3/CT4 to CT2 and/or gradually ramping the temperature down from CT2 to CT1/CT3/CT4. The ramps can be exponential or linear to minimize the processing time as necessary for a given epoxy resin formulation.

In each of the foregoing alternatives, the ramp-up may be of a different duration than the ramp down. A comparatively short ramp-up time is preferred for resins which out-gas and/or cross link more intensively at the end of the curing cycle. A comparatively short ramp-down time is preferred for resins which out-gas and/or cross link more intensively at the beginning of the curing cycle.

The foregoing steps yield a honeycomb sandwich panel with a paint ready surface, eliminating the need for fill and fare or film application operations, and in some cases the need for priming the surface, prior to painting. The porosity of prior art panels, conversely, creates the need for fill and fair or film application, commonly followed by sanding, applying primer, and finally painting. These improvements can save costs associated with the post-production processing and speed delivery of the panels to the customer. Because honeycomb sandwich panels are used throughout an aircraft (such as monuments, partitions, ceiling panels, cabinetry, galleys, lavatories, luggage bins, etc.) and because every surface that is not hidden or obscured will generally undergo a painting procedure, significant savings in time and costs are realized by producing a paint ready surface in the curing process.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

The invention claimed is:

1. A smooth-surfaced composite panel, comprising:
   a core layer;
   at least one reinforcement layer coupled to the core layer, the reinforcement layer comprising:
   a fabric layer,
   a first resin layer on a first side of the fabric layer, and
   a second resin layer on a second side of the fabric layer, the first resin layer, being thicker than the second resin layer, wherein the first resin layer is facing the core layer; and
   a paint-ready exterior surface, wherein the paint-ready exterior surface is the second resin layer of the reinforcement layer, wherein the paint-ready exterior surface is a smooth, pit-free surface such that the paint-ready exterior surface is ready for painting without fill and fare processing.

2. The panel as recited in claim 1, wherein the core layer is a honeycomb core.

3. The panel as recited in claim 2, wherein the honeycomb cores is an aluminum honeycomb core.

4. The panel as recited in claim 2, wherein the honeycomb core is a phenolic honeycomb core.

5. The panel as recited in claim 2, wherein the honeycomb core is an aramid honeycomb core.

\* \* \* \* \*